F. W. BILLINGS.
AUXILIARY PROTECTOR.
APPLICATION FILED MAR. 19, 1921.
1,391,665.
Patented Sept. 27, 1921.
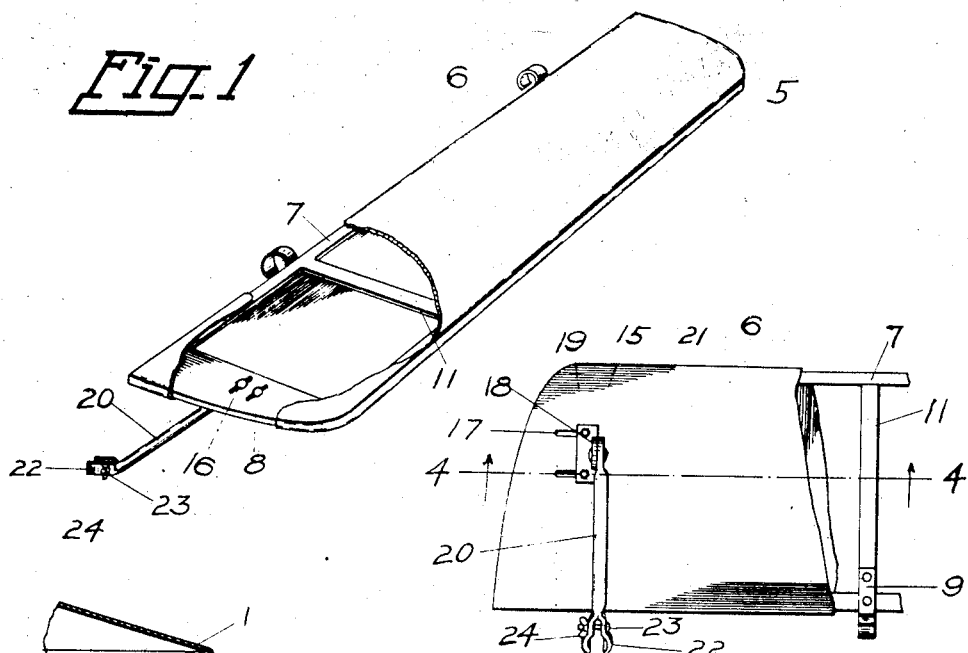
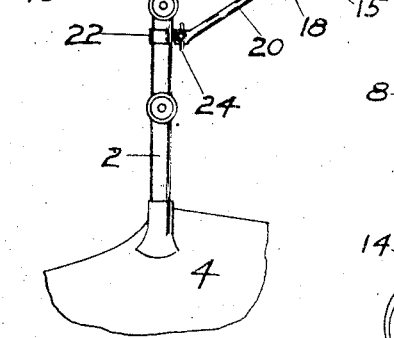
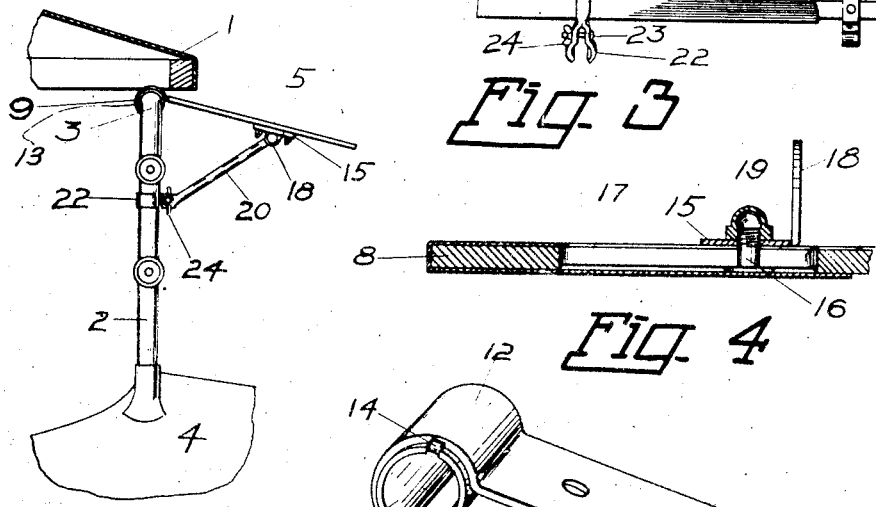
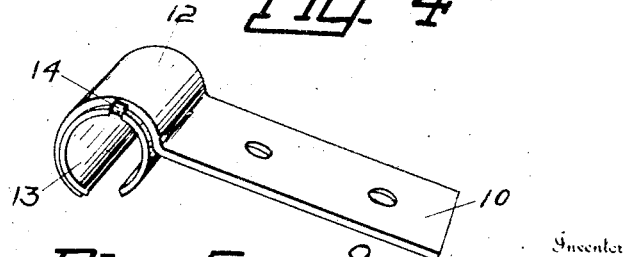
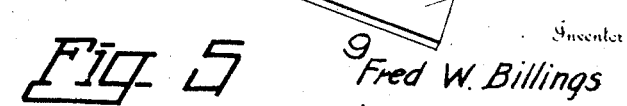
Inventor
Fred W. Billings
By
Herbert E. Smith
Attorney

UNITED STATES PATENT OFFICE.

FRED W. BILLINGS, OF MILLWOOD, WASHINGTON.

AUXILIARY PROTECTOR.

1,391,665.　　　　Specification of Letters Patent.　　Patented Sept. 27, 1921.

Application filed March 19, 1921. Serial No. 453,570.

*To all whom it may concern:*

Be it known that I, FRED W. BILLINGS, a citizen of the United States, residing at Millwood, in Spokane county and State of Washington, have invented certain new and useful Improvements in Auxiliary Protectors, of which the following is a specification.

My present invention relates to improvements in auxiliary protectors in the form of a vizor or pivoted panel for use as a deflector in connection with the wind shield of an automobile of the touring car, roadster, or other type.

The primary object of the invention is the provision of an auxiliary protector for use with the usual or standard form of wind shields, to which it is applicable, which will embody a pivoted, adjustable, and opaque panel located at the top and in front of the windshield, in such position as to afford a means for preventing rain, snow, sleet, &c., from accumulating on the transparent part of the shield, which is an undesirable contingency which results in obscuring the vision of the automobile driver.

To this end my invention consists in certain novel combinations and arrangements of parts whereby the device is applicable as an attachment to the windshield of most forms of cars of the above type and may be attached thereto with facility, may readily be adjusted with relation to the shield, and will be retained in adjusted position, against vibrations of the car in its travels.

In the accompanying drawings I have illustrated one complete example of the physical embodiment of my invention wherein the parts are combined and arranged according to the best mode I have thus far devised for the practical application of the principles of my invention, but it will be understood that colorable changes and alterations may be made in the exemplified form of the invention within the scope of my appended claims without departing from the spirit of the invention.

Figure 1 is a perspective view of a panel or shield made according to my invention, partly broken away for convenience of illustration.

Fig. 2 is a view of the device in side elevation applied to the wind shield of an automobile, part of the automobile top being shown in section.

Fig. 3 is a plan view, partly broken away, of the underside of the device.

Fig. 4 is a sectional view through the panel at line 4—4 in Fig. 3 illustrating the connection of the attaching plate to the panel for the adjustable bracket.

Fig. 5 is a perspective view of one of the panel hangers or supports.

In the preferred form of the invention as shown in the drawings I have illustrated a portion of an automobile of which the top is designated by the numeral 1, the side post of the windshield as 2, the top transverse bar 3, and a supporting part of the automobile is indicated at 4 in Fig. 2.

The panel or adjustable visor, in the form of an opaque deflector, is designated as a whole by the numeral 5, and is supported from the windshield near its upper portion in front thereof and below the top of the automobile as indicated in Fig. 2. A covering 6 of suitable material is laid on the open, rectangular frame 7, which latter is preferably of light metal structure or well seasoned hard wood, with end bars or plates 8 rounded at their front ends to enhance the appearance of the panel or shield. The protector extends forwardly from the automobile and is supported from the top frame bar 3 of the wind shield by means of a pair of spaced hangers or brackets each indicated as a whole by the numeral 9, and each of the brackets includes an attaching arm or metal plate 10, perforated for bolting or screwing to one of the intermediate panel bars 11 of the panel frame, as seen in Figs. 1 and 3. On each bracket arm 10 is fashioned an end, open, bearing sleeve 12, cylindrical in form and adapted to incase a bearing collar 13 that is also open, of smaller diameter than the sleeve, and preferably a little longer than said sleeve, to afford a base or fixed bearing for the sleeve to revolve on, when desired. At its ends the collar is fashioned with upturned lugs 14 to retain the sleeve against longitudinal movement on the collar but permit annular movement of the sleeve when adjusting the visor or protector. The collar 13 may be somewhat resilient in order that it may be snapped over the windshield bar 3, from the top, and may be clamped on the bar to hold thereto with a firm grip, thus providing a base bearing for the sleeve that will not mar the windshield frame. If desired the bearing between the sleeve and collar may be oiled or otherwise lubricated to insure easy movement when adjusting the parts.

The pivoted panel is thus suspended from the windshield frame, and it is supported in adjusted position either in horizontal location or at an angle thereto by means of a pair of adjustable bracket arms, located near the respective ends of the panel and each attached thereto by means of an adjustable attaching plate 15.

The plate 15 are each secured at the underside of an end bar 8 of the panel frame by bolts 16, passed through laterally extending slots 17 in the bar, and each bolt has a clamp nut 19 on the underside of the bar, the head of the bolt being inclosed by the covering 6 and hence invisible. The bolts may be clamped in adjusted position in the slots in order to adapt the panel or protector to different widths of windshields, and the bolts hold the attaching plates firmly at the underside of the protector. Each plate is fashioned with a depending, integral, perforated ear 19 to which a bracket arm 20 is pivoted as at 21, and the bracket arm has a lower forked head 22, a clamp bolt 23 passed therethrough, and a clamp nut 24 as shown.

The forks of the head are somewhat resilient in order that they may be snapped around the post 2 of the windshield, and then by tightening up the nuts 24, the head may be clamped firmly in place.

The clamp head, when the nut 24 is loosened, may be slid upwardly or downwardly on the windshield post to desired position, and when both of the bracket arms 20 are thus manipulated the vizor may be swung on its pivot sleeves 12 to either elevate or lower the protector, and when the desired position is reached, the clamp nuts 24 are turned home to secure the arms in desired angular position.

When moving the vizor, the latter readily swings on its pivotal supports 12—13 and 21, and when the clamp nuts are secured in place, the vizor is rigidly supported at triangular points at each end of the panel, thus providing a stable protector or deflector for the purpose required.

The panel is of course angularly adjustable, the supporting bracket arms are adjustable with relation to the panel through the bolt and slot connections in the bars 8, and the forked heads of the supporting bracket arms are vertically adjustable on the windshield posts or standards.

Having thus fully described my invention, what I claim as new and desire to secure by Letters Patent is—

1. The combination with a support, of a pair of frictionally engaged, open, bearing collars, of an adjustable panel, bearing sleeves attached to the panel and pivotally supported on said collars, and means for holding the panel in adjusted position.

2. The combination with a windshield frame, of a pair of spaced bearing collars fixed thereon, an adjustable panel, bearing sleeves attached to said panel and pivotally supported on said collars, and a pair of vertically adjustable bracket arms on said frame and means for laterally adjusting said arms to the panel.

In testimony whereof I affix my signature.

FRED W. BILLINGS.